United States Patent [19]

Sealey et al.

[11] Patent Number: 4,907,760
[45] Date of Patent: Mar. 13, 1990

[54] CONTRACTING LANDING GEAR SHOCK STRUT

[75] Inventors: Francis Sealey, Bellevue; Richard H. Weiland, Seattle, both of Wash.

[73] Assignee: The Boeing Company, Seattle, Wash.

[21] Appl. No.: 196,618

[22] Filed: May 18, 1988

[51] Int. Cl.⁴ .................................. B64C 25/10
[52] U.S. Cl. ......................... 244/100 R; 244/102 R; 244/102 SS
[58] Field of Search ........ 244/102 SS, 102 R, 102 A, 244/100 R, 104 FP, 104 R; 267/64.15, 64.22, 64.26; 280/709, 714

[56] References Cited

U.S. PATENT DOCUMENTS

| | | | |
|---|---|---|---|
| 2,106,289 | 1/1938 | Wallace | 244/102 |
| 2,186,266 | 1/1940 | Onions | 244/102 |
| 2,294,918 | 9/1942 | Levy | 244/102 |
| 2,390,661 | 12/1945 | Parilla | 244/102 |
| 2,423,736 | 7/1947 | Tack | 267/64.22 |
| 2,478,729 | 8/1949 | Westcott, Jr. | 244/102 |
| 2,484,919 | 10/1949 | Westcott, Jr. | 244/102 |
| 2,554,581 | 5/1951 | Levy | 244/102 |
| 2,567,114 | 9/1951 | Linn | 244/102 |
| 2,621,004 | 12/1952 | Ashton et al. | 244/102 |
| 2,735,634 | 2/1956 | Fosness | 244/104 |
| 2,754,072 | 7/1956 | Shapiro | 244/102 |
| 2,892,626 | 6/1959 | Scott et al. | 244/102 R |
| 3,011,777 | 12/1961 | Stout | 244/102 R |
| 4,047,681 | 9/1977 | Hartel | 244/102 |
| 4,291,850 | 9/1981 | Sharples | 244/102 |
| 4,328,939 | 5/1982 | Davies et al. | 244/102 |
| 4,524,929 | 6/1985 | Gebhard | 244/63 |
| 4,540,142 | 9/1985 | Veaux et al. | 244/102 |
| 4,561,612 | 12/1985 | Masclet | 244/104 |
| 4,630,788 | 12/1986 | Veaux et al. | 244/104 |

FOREIGN PATENT DOCUMENTS

| | | | |
|---|---|---|---|
| 448266 | 5/1948 | Canada | 244/102 |
| 1756287 | 4/1970 | Fed. Rep. of Germany . | |
| 996613 | 8/1954 | France | 244/102 |
| 156796 | 10/1956 | Sweden | 244/102 |
| 881718 | 11/1961 | United Kingdom | 244/102 |
| 1011830 | 12/1965 | United Kingdom | 244/102 |

Primary Examiner—Joseph F. Peters, Jr.
Assistant Examiner—Anne Sartelle
Attorney, Agent, or Firm—Joan H. Pauly

[57] ABSTRACT

Initial retraction of telescoping cylinders (22, 72) forces hydraulic fluid through an orifice area into a low pressure chamber (116). When the cylinders (22, 72) reach a predetermined position, a stop surface (120) carried by the second cylinder (72) engages a floating member (52) carried by the first cylinder (22). Further retraction causes the floating member (52) to move relative to the first cylinder (22) and compress a high pressure chamber (44). When the shock strut (20) is pivoted into a stowed position, the cylinders (22, 72) are retracted to the predetermined position without compressing the high pressure chamber (44). In a second embodiment, a linkage mechanism (298) moves the high pressure chamber (318) relative to the first cylinder (272) to allow the shock strut (220) to be shortened beyond the predetermined position without compressing the high pressure chamber 318.

22 Claims, 9 Drawing Sheets

CONTRACTING LANDING GEAR SHOCK STRUT

TECHNICAL FIELD

This invention relates to aircraft landing gear shock struts which are shortened when the landing gear is retracted following takeoff and, more particularly, to such a shock strut which has a first relatively low pressure air cushion that is compressed by hydraulic fluid which flows through a restricted orifice, and a second relatively high pressure air cushion which is compressed following the compression of the first air cushion.

BACKGROUND ART

In the design and manufacture of aircraft, it is generally desirable to minimize the space required by components of the aircraft. One example of an approach to saving space in aircraft is the variety of proposals that have been made for shortening the landing gear when it is retracted into a stowed position in the aircraft. The shortening of the landing gear may be required by the initial design of an aircraft or may be desired in order to minimize design changes in future generations of an existing aircraft. There is currently a trend toward providing new generations of existing aircraft with longer fuselages. A longer fuselage generally requires longer landing gear to provide ground clearance for the tail on takeoff. When the landing gear in earlier generations has been retracted in its extended position, i.e. without contracting the landing gear, it is possible to minimize the design changes required by the lengthening of the fuselage by modifying the landing gear to shorten upon retraction so that it may be stowed within the existing wheel well.

The shortening of the landing gear shock strut upon retraction may sometimes be accomplished by providing an actuator which compresses the shock absorber spring. This approach has been used successfully on small aircraft. However, in larger aircraft the approach is impractical because of the relatively great retraction actuator effort required. A number of systems have been proposed which avoid the actuator effort problem by the use of mechanically or electrically operated hydraulic valves that operate to relieve the pressure in the shock absorber during retraction. Systems which rely on valves to relieve the pressure have the disadvantage of adding to the weight and complexity of the landing gear and retraction system. In addition, the accumulators that receive the pressurized fluid to relieve the pressure in the shock absorbing mechanism may themselves require space, thereby decreasing the net space savings of the system.

Landing gear systems in which metered flow of a liquid acts on an air cushion to absorb shocks and which are shortened upon contraction are disclosed in U.S. Pat. Nos. 2,106,289, granted Jan. 25, 1938, to J. F. Wallace; 2,186,266, granted Jan. 9, 1940, to J. H. Onions; 2,294,918, granted Sept. 8, 1942, to R. L. Levy; 2,390,661, granted Dec. 11, 1945, to A. R. Parilla; 2,478,729, granted Aug. 9, 1949, to W. B. Westcott, Jr.; 2,554,581, granted May 29, 1951 to R. L. Levy; 2,621,004, granted Dec. 9, 1952, to B. N. Ashton et al.; 2,754,072, granted July 10, 1956, to S. Shapiro; and 4,291,850, granted Sept. 29, 1981, to W. Sharples. Such systems are also disclosed in French Patent No. 996,613, published Aug. 23, 1954, and granted to P. Lallemant; British Patent Specification No. 881,718 of the inventor G. S. Cranwell, published Nov. 8, 1961; and Swedish Patent No. 156,796, granted to Svenska Aeroplan AB, and published Oct. 30, 1956. A wholly pneumatic shock absorber is disclosed in Canadian Patent No. 448,266, granted May 4, 1948, to R. S. Sanford.

The Shapiro patent discloses aircraft landing gear having an outer cylinder, an inner cylinder, and a head portion. The head portion has a fixed length defined by two spaced piston portions which slidably engage the inner surfaces of the outer and inner cylinders, respectively. The cylinders and the head portion together define an annular chamber of fixed volume that surrounds an internal chamber. In its operational position for landing and taxiing, the position of the head portion relative to the outer cylinder is fixed. Impact loads during landing and taxiing cause the inner cylinder to telescope into the outer cylinder. A metering pin carried by the inner cylinder extends into the internal chamber defined by the head portion to compress an air spring formed within the head portion and absorb the impact loads. Upon retraction of the landing gear, linkage which is attached to the top of the head portion raises the head portion relative to the outer cylinder. The lower piston portion of the head portion engages stops carried by the inner cylinder to pull the inner cylinder upwardly and thereby shorten the overall length of the landing gear. This shortening of the landing gear during retraction is accomplished without changing the internal volume of any of the chambers in the shock absorber, except the small annular chamber between the lower portion of the outer cylinder and the upper portion of the inner cylinder. This annular chamber expands to assist in the retraction. The linkage which raises the head portion is fixed to the aircraft structure and holds the head portion in its fixed operative position during landing and taxiing.

The Cranwell British patent specification discloses landing gear with a relatively complicated arrangement of internal chambers and valves. On landing and taxiing, the landing gear strut contracts in two stages. The first stage of contraction has a relatively low resistance because one of the oil chambers is expanding and because flow resistances are relatively low. The second stage of contraction provides greater resistance for taxiing. In both stages, oil enters an upper chamber past a piston rod assembly to compress an air cushion formed in the upper chamber. On retraction of the landing gear, a hydraulic jack between the outer and inner cylinders telescopes the inner cylinder into the outer cylinder only to the end of the first stage of contraction. Therefore, there is relatively low resistance to the shortening of the landing gear on retraction.

The Swedish patent discloses landing gear in which metered flow into a pressure chamber of fixed volume compresses an air cushion in the pressure chamber to absorb landing and taxiing loads. During retraction of the landing gear, the inner cylinder is telescoped into the outer cylinder by a hydraulic cylinder extending between the inner and outer cylinders. In order to maintain the volume of the air cushion constant during retraction, hydraulic fluid from the inner cylinder is directed to an auxiliary chamber above the pressure chamber through a tube that extends upwardly through the pressure chamber. The top of the auxiliary chamber is defined by a movable piston that is raised during the retraction sequence to increase the volume of the auxiliary chamber without a pressure increase. The piston is moved upwardly by the pivoting of a linkage mechanism having one end attached to the aircraft structure and an opposite end attached to the piston. The pivoting of the linkage mechanism also operates an internal valve to open communication between the contracting chamber of the inner cylinder and the auxiliary cylinder.

A number of the other patents cited above also disclose landing gear in which a valve mechanism operates to allow fluid flow into an accumulator during the retraction procedure so that the gear can contract without raising the pressure in the shock absorbing mechanism. The accumulator may be positioned within or separately from the landing gear strut. Landing gear systems in which the pressure is relieved by bleeding air from the air cushion are disclosed by Wallace, Parilla, and Westcott, Jr. The Onions and the two Levy patents disclose systems in which hydraulic fluid is bled into a reservoir to allow the volume of a separate air cushion to remain constant during retraction. In the system disclosed by Sharpels, hydraulic fluid is drained from a separate chamber during retraction to allow a piston to move downwardly and thereby provide space for displaced fluid above the piston without increasing the shock absorber pressure. The Canadian patent to Sanford discloses a pneumatic shock absorber in which air is bled from the main chamber to relieve pressure during retraction.

Ashton et al. disclose landing gear which is contracted upon retraction with no pressure relief and which uses the energy stored by the compression of the shock absorber spring to help extend the landing gear. The French patent discloses a shock absorber which is contracted upon retraction with no apparent pressure relief.

U.S. Pat. Nos. 4,540,142, granted Sept. 10, 1985, to J. Veaux et al.; and 4,561,612, granted Dec. 31, 1985, to J. Masclet, each disclose landing gear which is contracted upon retraction but do not disclose any details of the shock absorbing mechanism or any means of pressure relief. There are also a number of patents which disclose systems for retracting landing gear struts and shortening the struts as they are retracted but do not disclose the structure of the shock absorbers associated with the struts. Retraction actuators and linkages are disclosed in U.S. Pat. Nos. 2,484,919, granted Oct. 18, 1949, to W. B. Westcott, Jr.; and 4,047,681, granted Sept. 13, 1977, to E. H. Hartel. Hartel does state that the strut is shortened against the force of the shock absorber spring. U.S. Pat. No. 2,567,114, granted Sept. 4, 1951, to C. E. Linn, discloses a latch mechanism for locking landing gear in a stowed position. West German Patent Document No. 1,756,287, published Apr. 9, 1970; and British Patent Specification No. 1,011,830, published Dec. 1, 1965, each disclose a lever system for raising a shock absorber mechanism within a landing gear strut to shorten the overall length of the strut during retraction. U.S. Pat. No. 4,630,788, granted Dec. 23, 1986, to J. Veaux et al., discloses helicopter landing gear in which hydraulic fluid is drained from separate chambers to allow the gear to contract or collapse and thereby move the helicopter into a "kneeling" position.

U.S. Pat. No. 2,735,634, granted Feb. 21, 1956, to J. P. Fosness, discloses an aircraft shock absorbing strut for landing gear which is stowed in an extended, rather than a retracted, position. The shock absorber includes a lower chamber into which pressurized fluid is fed to raise the aircraft nose for takeoff. The pressurized fluid first moves a piston which carries a metering pin upwardly toward a pressure chamber and then moves the inner cylinder of the shock absorber downwardly relative to the outer cylinder. This latter movement increases the length of the strut. U.S. Pat. No. 4,524,929, granted June 25, 1985, to D. F. Gebhard, discloses an aircraft landing gear shock strut in which the inner and outer cylinders are locked together in a compressed position prior to takeoff. A gas charge is added to the pressure chamber and then the inner and outer cylinders are released from their locked position. The gas charge provides a vertical force which jumps the aircraft into the air. After takeoff, the pressure is discharged from the chamber so that the shock absorber is ready for its shock absorbing function upon landing.

In the Parilla and the earlier Westcott patents, a linkage mechanism with one end attached to fixed aircraft structure operates to open a valve during retraction to bleed air from the air cushion. The Parilla system also includes a telescoping cylinder with one end attached to the bottom of the inner cylinder of the shock absorber and an opposite end attached to fixed aircraft structure. The latter attachment is offset from the pivot point of the outer cylinder of the shock absorber so that the telescoping cylinder automatically pulls the inner cylinder into the outer cylinder when the shock absorbing strut is retracted into a stowed position. The inner cylinder is similarly contracted by a cable in the earlier Levy patent and the Linn patent, by rigid struts in the Canadian patent, by a rigid link in the earlier Veaux patent, and by a linkage mechanism in the Ashton et al. patent.

The above patents and the prior art that is discussed and/or cited therein should be studied for the purpose of putting the present invention into proper perspective relative to the prior art.

DISCLOSURE OF THE INVENTION

A subject of the invention is a shock absorber in an aircraft landing gear assembly. According to an aspect of the invention, the shock absorber comprises first and second generally tubular members positioned telescopically with respect to each other. A floating member is carried by and is axially slidable with respect to the first tubular member. The first and second tubular members and the floating member define a first pressure chamber, a reserve chamber, and a second pressure chamber. Passageway means provides a metered hydraulic orifice area between the reserve chamber and the first pressure chamber. The shock absorber also includes stop means carried by the second tubular member for engaging the floating member and sliding the floating member relative to the first tubular member, when the tubular members retract relative to each other beyond a predetermined position, to reduce the volume of the second pressure chamber. The shock absorber has first and second modes of operation. In the first mode of operation, the volume of the reserve chamber decreases, and the volume of the second pressure chamber remains essentially constant, as the tubular members retract relative to each other toward the predetermined position. In the second mode of operation, the volume of the second pressure chamber decreases as the tubular members retract relative to each other beyond the predetermined position.

Preferably, the shock absorber comprises a first metering portion including a metering pin, and a second metering portion including a generally radially extending wall that defines the orifice area. One of the metering portions is secured to the second tubular member, and the other is carried by the floating member. The first tubular member carries a radial wall that defines a first radial wall of the second pressure chamber, and the floating member includes a radial wall that defines a second opposite radial wall of the second pressure chamber. When the metering pin is carried by the floating member, the stop means preferably comprises a substantially frustoconical wall extending from the orifice defining wall radially inwardly and axially toward the second pressure chamber. The frustoconical wall terminates in an outer end positioned to engage a radial shoulder on the metering pin.

A preferred feature of the invention is cushioning means carried by the stop means and the floating member for cushioning the engagement of the floating member by the stop means. This preferred feature may be provided in combination with the floating metering pin and frustoconical wall, as described above. In such case, the outer end of the frustoconical wall and the shoulder on the pin together form the cushioning means.

Another subject of the invention is the combination of the shock absorber described above, aircraft landing gear support structure, and means for pivoting the shock absorber. One of the tubular members is pivotably attached to the support structure. The means for pivoting the shock absorber into a stowed position relative to the support structure and shortens the shock absorber, as it is being pivoted, by retracting the tubular members relative to each other substantially to the predetermined position.

In a first preferred embodiment, the second tubular member is pivotably attached to the support structure and carries a fixed generally radially extending wall that defines the orifice area. The first tubular member carries a fixed radial wall that defines a bottom radial wall of the second pressure chamber. The floating member includes a metering pin, and a radial wall that defines an opposite top radial wall of the second pressure chamber. This arrangement has the advantages of relative simplicity of structure and of facilitating the positioning of the first pressure chamber in the shock strut without the use of a low pressure accumulator.

In another preferred embodiment of the combination, the first tubular member is pivotably attached to the support structure and carries a radial wall that defines a first radial wall of the second pressure chamber. The floating member includes a radial wall that defines a second opposite radial wall of the second pressure chamber. The combination further comprises auxiliary shortening means for further shortening the shock absorber by allowing the tubular members to retract relative to each other beyond the predetermined position without decreasing the volume of the second pressure chamber. The auxiliary shortening means comprises a linkage mechanism having opposite ends secured to the support structure and the first radial wall of the second pressure chamber, respectively. The linkage mechanism is pivotable to move the first radial wall axially upwardly relative to the first tubular member. Preferably, said first radial wall of the second pressure chamber has an axial extension with means for engaging the second radial wall to pull the second radial wall axially upwardly along with the first radial wall and maintain the volume of the second pressure chamber essentially constant as the linkage mechanism moves the first radial wall.

Another subject of the invention is a method for absorbing landing and taxiing shocks of an aircraft. According to an aspect of the invention, the method comprises providing first and second generally tubular members positioned telescopically with respect to each other and having a first pressure chamber and a second pressure chamber. The first and second pressure chambers are pressurized to create first and second gas cushions, respectively, with first and second maximum pressures, respectively, and first and second minimum pressures, respectively. The first maximum pressure is less than the second minimum pressure. While the aircraft is in flight, the tubular members are pivoted into a landing position and are substantially fully extended with respect to each other. The aircraft is landed, and the compressive force of landing and taxiing shocks is applied to the tubular members to cause them to retract relative to each other to a predetermined position. While the tubular members are so retracting, their retraction compresses the first gas cushion, and the volume of the second gas cushion is maintained essentially constant. When the tubular members reach the predetermined position, the compressive force is allowed to cause them to retract relative to each other beyond the predetermined position. While the tubular members are retracting beyond the predetermined position, their retraction compresses the second gas cushion. Preferably, the compression of the first gas cushion comprises allowing hydraulic fluid to flow through a metered hydraulic orifice area.

The method of the invention preferably further comprises accomplishing a takeoff of the aircraft with the tubular members in the landing position. Then the tubular members are pivoted from the landing position into a stowed position. As the tubular members are pivoting, the members are retracted relative to each other substantially to the predetermined position, and the volume of the second gas cushion is maintained essentially constant. The method may also include further retracting the tubular members relative to each other beyond the predetermined position while they are being pivoted into the stowed position. The second pressure chamber is moved axially upwardly relative to the tubular members to allow such members to further retract without compressing the second gas cushion.

The method and apparatus of the invention provide means for effectively and efficiently absorbing landing and taxiing shocks of an aircraft and of minimizing the amount of space required by the aircraft landing gear when it is in a stowed position. The minimizing of the required stowage area in turn makes it possible to minimize design changes in new generations of aircraft with longer fuselages than previous generations. In new aircraft designs, as opposed to new generations of existing aircraft designs, the minimizing of the required stowage area helps to maximize efficient use of space on the aircraft.

The design of the shock absorber of the invention provides a two-stage retraction of the shock absorber while maintaining relative simplicity of structure. The two-stage retraction allows the shock absorber to be shortened, as it is being moved into a stowed position, against relatively low resistance so that relatively little actuator effort is required. The combination of the simplicity of structure and the relatively low required actuator effort help maximize weight and space savings. In addition, these factors help make the system of the invention highly reliable and cost efficient.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 10 is a fragmentary sectional view of a portion of the metering pin and frustoconical wall shown in FIGS. 2-4, showing the end of the wall and the shoulder on the pin spaced from each other.

FIG. 11 is like FIG. 10 except that it shows the end of the wall and the shoulder moving into engagement with each other.

BEST MODES FOR CARRYING OUT THE INVENTION

Figure 1:
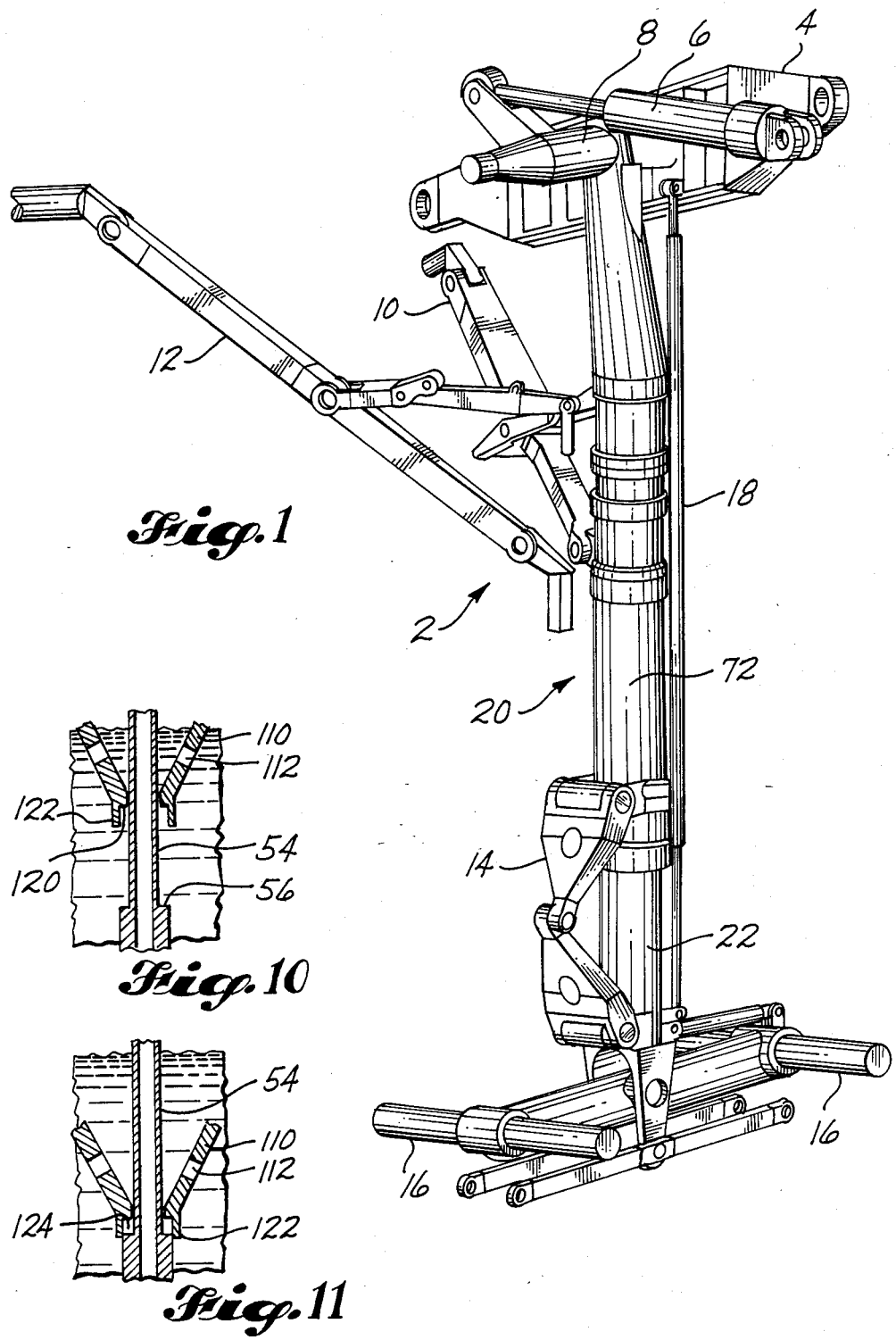
FIG. 1 is a pictorial view of a first preferred embodiment of the apparatus of the invention.

The drawings show two embodiments of landing gear apparatus that are constructed according to the invention and that also constitute the best modes of the apparatus of the invention currently known to the applicants. The drawings also illustrate the best modes for carrying out the method of the invention currently known to the applicants. In FIG. 1, the first embodiment is shown incorporated into a landing gear assembly 2. It is anticipated that the method and apparatus of the invention will be used primarily in assemblies such as that shown in FIG. 1. However, it is of course to be understood that the method and apparatus of the invention may also be used to advantage in connection with other types of landing gear assemblies.

The landing gear assembly 2 shown in FIG. 1 is of the type disclosed in U.S. Pat. No. 4,328,939, granted May 11, 1982, to J. W. Davies et al. The assembly 2 has a number of features which are not a part of the present invention and which are fully described in the Davies et al. patent. These features include an actuator 6 for pivoting the landing gear between its stowed and use positions, a trunnion assembly 8 to which the shock strut 20 is attached, a jury strut 10, a drag strut 12, a torsion link assembly 14, and wheel axles 16. The trunnion assembly 8 is pivotably attached to aircraft support structure that includes the wing landing gear beam 4 shown in FIG. 1. The assembly 2 shown in FIG. 1 also includes a shortening link 18 that is not disclosed in the Davies et al. patent and is described further below in connection with the second embodiment shown in FIGS. 12-18.

Referring to FIGS. 1-4, the shock strut 20 comprises a first tubular member or inner cylinder 22 and a second tubular member or outer cylinder 72. These cylinders 22, 72 are positioned telescopically with respect to each other. In use, the wheels of the landing gear are attached to the bottom end of the inner cylinder 22 in the manner described by Davies et al. The top portion of the outer cylinder 72 is attached to the trunnion assembly 8 at a pivot connection 82. The actuator 6 engages the trunnion assembly 8 to pivot the assembly 8 and thereby pivot the shock strut 20 between its stowed and use positions.

Figure 2:
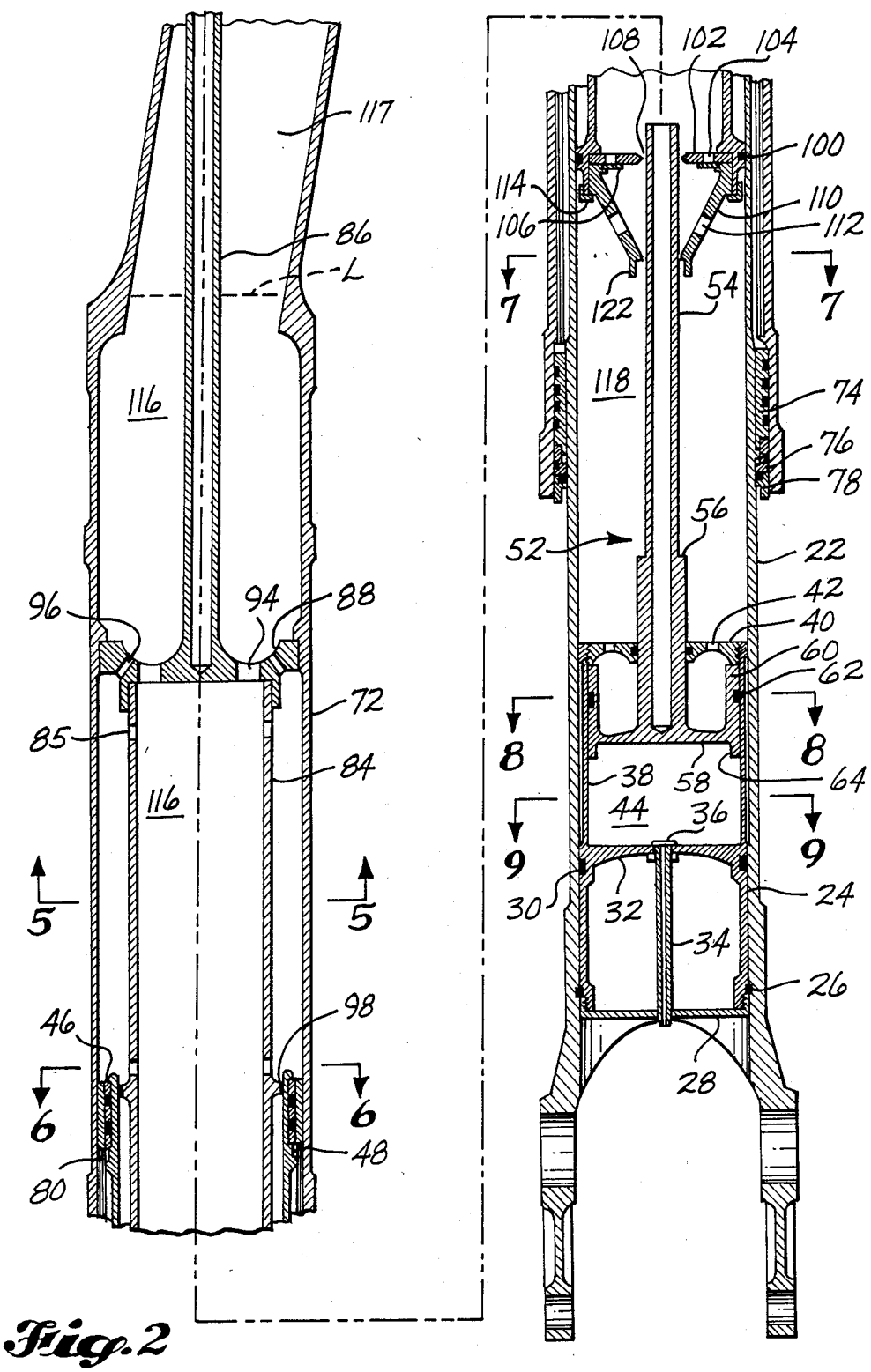
FIG. 2 is a sectional view of the shock strut shown in FIG. 1 in a fully extended position.
Figure 3:
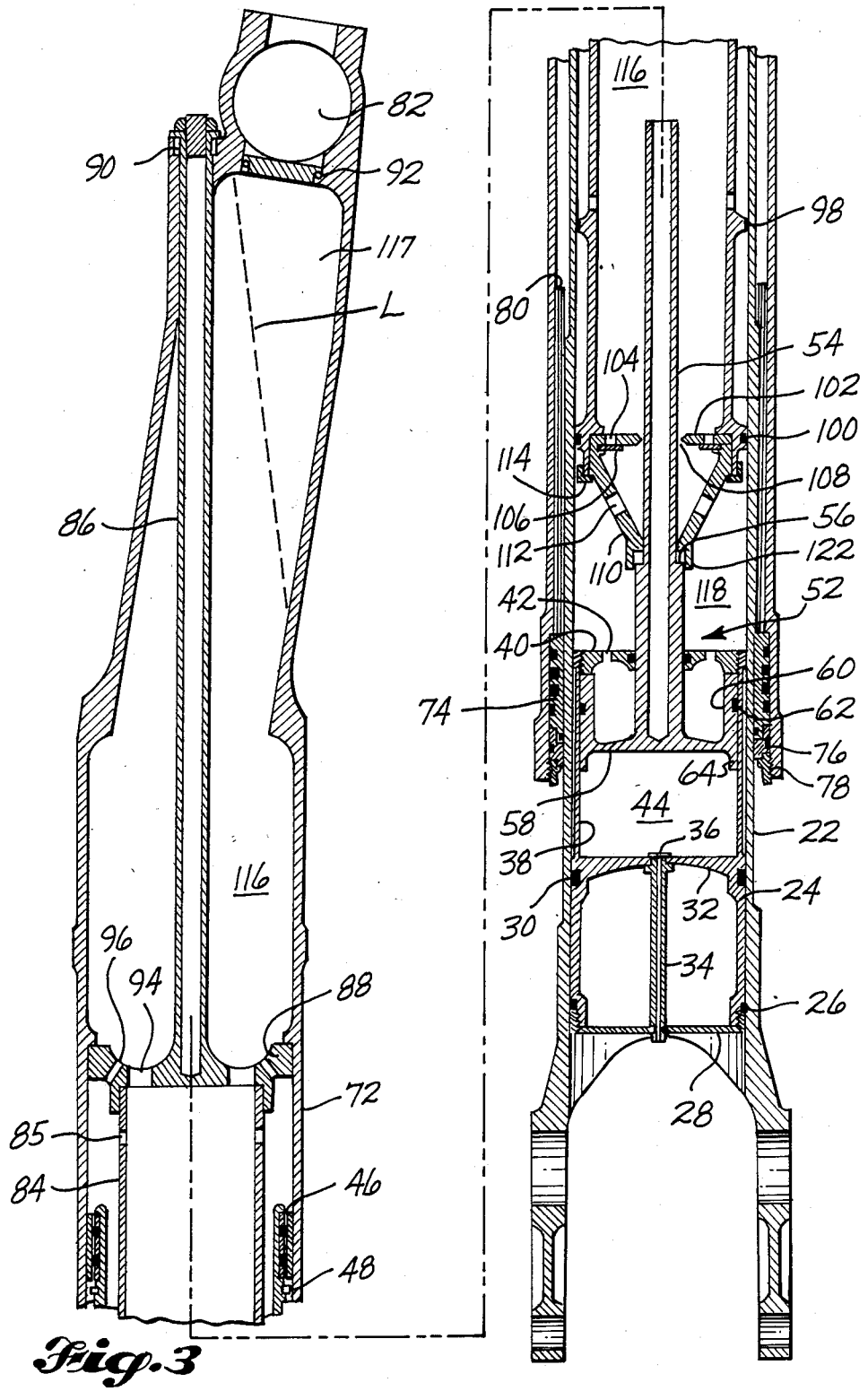
FIG. 3 is like FIG. 2 except that it shows the shock strut in its stowed position.
Figure 4:
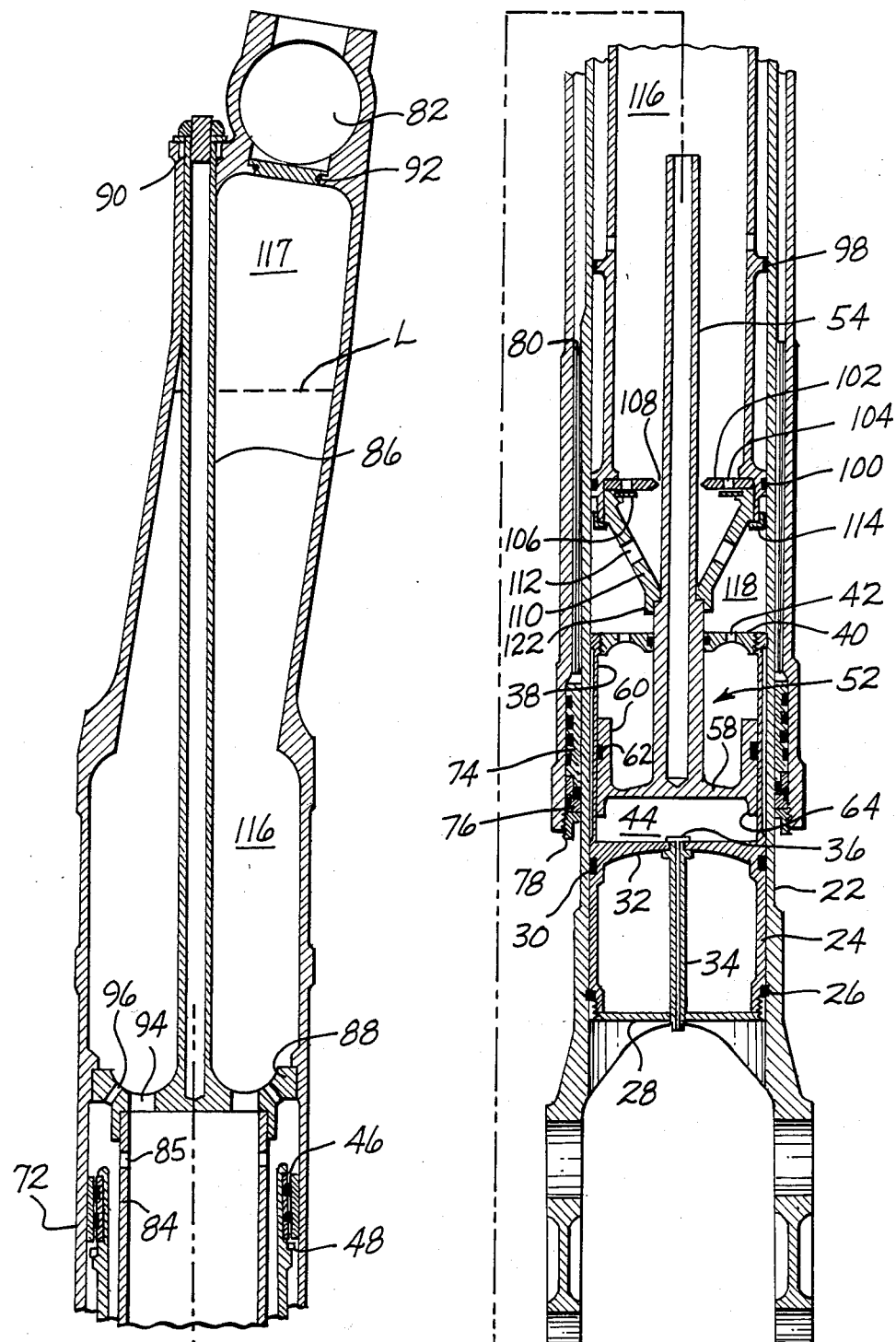
FIG. 4 is like FIG. 2 except that it shows the shock strut in its maximum taxi position.
Figure 5:
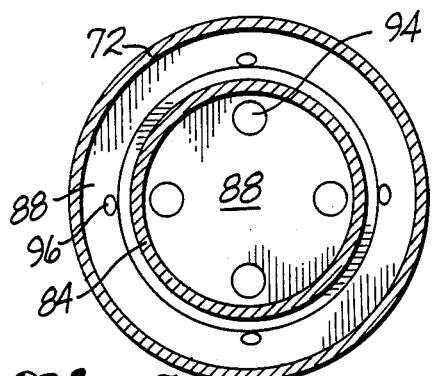
FIGS. 5-9 are cross-sectional views taken along the lines 5—5 through 9—9, respectively, in FIG. 2.
Figure 6:
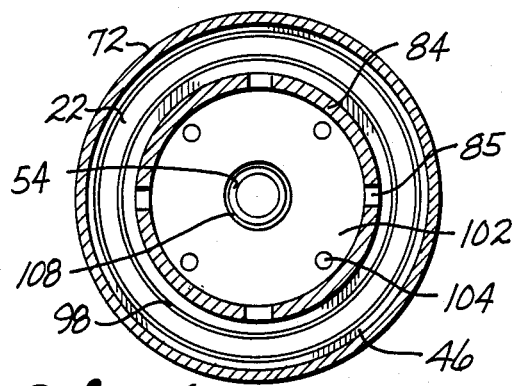
Figure 7:
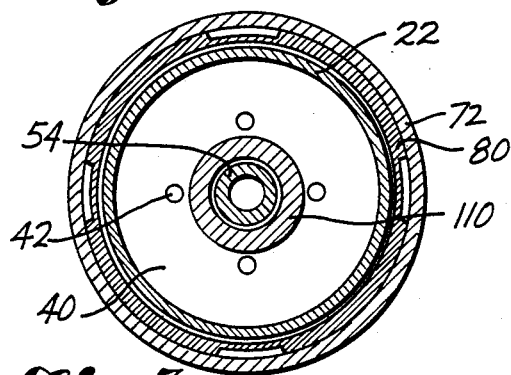
Figure 8:
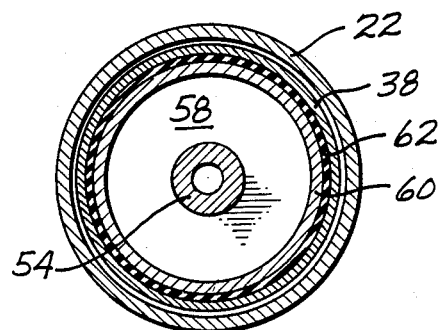
Figure 9:
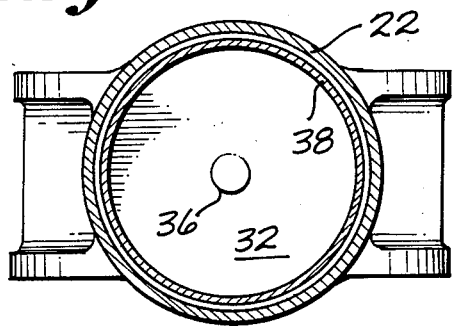

Referring to FIGS. 2-4, the inner cylinder 22 carries a high pressure insert or canister 24 in its lower end portion. The insert 24 is retained in the cylinder 22 by a split ring retainer 26 that engages a groove in the cylinder 22. The ring 26 is held in position by a threaded end cap 28. The insert 24 has a radial wall 32 that is spaced axially inwardly from the end cap 28 and that forms the bottom radial wall of a high pressure chamber 44, described further below. A sealing ring 30 is positioned between the inner cylinder 22 and the cylindrical wall of the insert 24 near the bottom of the radial wall 32. An inflation tube 34 extends axially inwardly through the approximate radial center of the insert 24 from the end cap 28 to the radial wall 32. A check valve 36 is provided at the radial wall end of the inflation tube 34 to prevent pressurized air from escaping out of the high pressure chamber 44 through the inflation tube 34.

The insert 24 has an integral cylindrical axial extension 38 extending axially inwardly from its radial wall 32. An annular radial wall 40 is secured to the upper end of the axial extension 38. A plurality of orifices 42 extend axially through the wall 40. The lower end of a floating member 52 is slidingly received within the high pressure insert 24 between the radial wall 32 and the annular radial wall 40. The wall 40 functions as a stop for the floating member 52 and as a damper for the movement of the floating member 52.

The upper end of the inner cylinder 22 carries a bearing assembly 46 for sliding engagement with the inner cylindrical surface of the outer cylinder 72. Recoil apertures extend through the upper end of the inner cylinder 22 at the location of the bearing assembly 46. These apertures enable the cylinders 22, 72 to telescope relative to each other. A recoil valve 48 is provided to control extension of the inner cylinder 22 with respect to the outer cylinder 72 and prevent sudden rapid extension thereof.

The floating member 52 includes a high pressure piston 58 that forms the top radial wall of the high pressure chamber 44. The high pressure chamber 44 is defined by the radial wall 32 of the high pressure insert 24, the cylindrical wall of the axial extension 38, and the high pressure piston 58. An integral cylindrical wall 60 extends axially inwardly from the periphery of the piston 58. The wall 60 carries a seal 62. The upper end of the wall 60 engages the annular radial wall 40 to limit movement of the piston 58 away from the radial wall 32 and thereby limit the expansion of the high pressure chamber 44. An annular lip 64 extends axially outwardly from the periphery of the piston 58 opposite the wall 60. This lip 64 limits the compression of the chamber 44 and prevents the piston 58 from bottoming out on the radial wall 32.

The floating member 52 carries an integral metering pin 54 which extends axially inwardly from the center portion of the piston 58. The pin 54 extends through a center opening formed by the annular wall 40 and up into a reserve chamber 118 and a pressure chamber 116, described further below. The metering pin 54 has a radial shoulder 56 formed thereon for limiting the movement of the pin 54, as described below.

The outer cylinder 72 extends from its pivot connection 82 to a lower end which carries a lower bearing assembly 74. The assembly 74 slidingly engages the outer cylindrical surface of the inner cylinder 22. A gland nut assembly 76, 78 is carried by the cylinder 72 outwardly of the bearing assembly 74. The gland nut assembly includes a seal member 76 and a nut 78 which threadedly engages the cylinder 72. A spacer tube 80 is formed on the inner cylindrical surface of the outer cylinder 72 axially inwardly of the bearing assembly 74. The spacer tube 80 acts as a stop to limit extension of the inner cylinder 22 relative to the outer cylinder 72, as shown in FIG. 2.

The outer cylinder 72 carries an annular orifice plate 102 with a center axial opening through which the metering pin 54 extends. An annular gap between the inner edge of the plate 102 and the outer generally cylindrical surface of the pin 54 forms a passageway that provides a metered hydraulic orifice area 108. The orifice plate 102 is secured to the outer cylinder 72 by means of an orifice support tube 84. The tube 84 extends axially inwardly from the plate 102 and is secured at its upper end to a radial mounting flange 88 formed on the bottom end of a support strut 86. The support strut 86 extends axially to a point adjacent to the pivot connection 82. The upper end of the support strut 86 is secured to the upper end of the outer cylinder 72 to support the orifice support tube 84 and the orifice plate 102. The orifice support tube 84 is provided with an upper bearing 98 and a lower piston ring 100 which slidingly engage the inner cylindrical surface of the inner cylinder 22 when the cylinders 22, 72 telescope with respect to each other.

A pressure chamber 116 is defined within the outer cylinder 72 above the orifice plate 102. The chamber 116 extends from the plate 102 to the top of the outer cylinder 72 adjacent to the pivot connection 82. A machine access hole at the top of the chamber 116 has a closure with a seal 92 to seal the top of the chamber 116. The top of the support strut 86 is also provided with a seal 90 to prevent leakage from the chamber 116. The orifice support tube 84 has openings 85 extending radially therethrough to provide free fluid communication between the areas inside and outside the tube 84. The mounting flange 88 has openings 94 extending axially therethrough and openings 96 extending diagonally therethrough to provide free communication between the internal areas of the outer cylinder 72 above and below the mounting flange 88. The chamber 116 is filled with hydraulic fluid to a level L. Above the level L, a low pressure air cushion 117 is formed. The inclusion of the area above the mounting flange 88 in the volume of the chamber 116 has the advantage of providing sufficient space for the chamber 116 within the shock strut 20 to avoid a need for a low pressure accumulator external to the strut 20.

The orifice plate 102 has a plurality of apertures 104 formed therein. The apertures 104 allow free extension of the inner and outer cylinders 22, 72 relative to each other. During retraction of the cylinders 22, 72, the apertures 104 are closed by an annular disk check valve 106 so that retraction is retarded by movement of hydraulic fluid through the metered hydraulic orifice area 108. The valve disk 106 is retained in position by the upper cylindrical end of a frustoconical extension 110 of the orifice plate 102. The frustoconical wall 110 has a lower end which engages the metering pin 54, as described below. Openings 112 are provided in the frustoconical wall 110 to allow free flow of hydraulic fluid past the frustoconical wall 110. A retainer 114 secures the orifice plate 102 and its frustoconical extension 110 to the orifice support tube 84.

Referring to FIGS. 10 and 11, the shock strut 20 is provided with stop means for engaging the floating member 52 when the inner and outer cylinders 22, 72 have retracted relative to each other to a predetermined position, and for sliding the floating member 52 relative to the inner cylinder 22. The relative movement between the floating member 52 and the inner cylinder 22 causes compression of the high pressure chamber 44, as shown in FIG. 4. The stop means includes a radial stop surface 120 formed on the outer end of the frustoconical wall 110, and the radial shoulder 56 on the metering pin 54. The engagement of the stop surface 120 and the shoulder 56 is illustrated in FIG. 4.

In order to cushion the engagement of the metering pin 54 by the frustoconical wall 110, damping means is provided, as illustrated in FIGS. 10 and 11. An annular damper flange 122 is formed on the end of the frustoconical wall 110. As the stop surface 120 approaches the shoulder 56, hydraulic fluid is trapped in a damper chamber 124 formed between the stop surface 120, the shoulder 56, and the flange 122. The trapping of the fluid in the chamber 124 retards further movement of the shoulder 56 and the stop surface 120 toward each other. Hydraulic fluid slowly leaks out of the damper chamber 124 to provide a cushioned stop of the relative movement In the method of the invention, the volume of the high pressure chamber 44 is filled with high pressure air to provide a high pressure air cushion. The reserve chamber 118, formed between the pressure chamber 116 and the high pressure chamber 44, is filled with hydraulic fluid. The pressure chamber 116 is filled with hydraulic fluid to the level L. The upper portion of the chamber 116 is pressurized with air to form a relatively low pressure air cushion 117. In the method of the invention, the two pressure chambers 44, 116 are provided with differential pressures, with the maximum pressure of the chamber 116 being less than the minimum pressure of the chamber 44. Examples of suitable pressures are a minimum pressure of about 1000 psi and a maximum pressure of about 3200 psi in the high pressure chamber 44 and a minimum pressure of about 40 psi and a maximum pressure of about 100 psi in the low pressure chamber 116.

The operation of the landing gear assembly 2 shown in FIGS. 1–11 is as follows. While the aircraft is in flight, the shock strut 20 is pivoted into a landing position to prepare for landing. As the shock strut 20 pivots, the inner cylinder 22 moves axially outwardly relative to the outer cylinder 72 to its fully extended position shown in FIG. 2. During the extension of the inner cylinder 22, the floating member 52 moves with the inner cylinder 22 and the volume of the high pressure chamber 44 remains essentially constant. The check valve 106 opens to allow movement of hydraulic fluid from the pressure chamber 116 to the expanding reserve chamber 118 through the apertures 104 in the orifice plate 102. The recoil valve 48 operates to control the rate of movement of the inner cylinder 22 relative to the outer cylinder 72. As hydraulic fluid moves from the pressure chamber 116 to the reserve chamber 118, the pressure in the low pressure air cushion 117 formed at the top of the pressure chamber 116 decreases to its minimum level.

When the aircraft lands, the compressive force of landing and taxiing shocks causes the inner cylinder 22 to telescope into the outer cylinder 72. During the initial retraction of the cylinders 22, 72 relative to each other, the volume of the high pressure chamber 44 remains essentially constant. The rate of retraction is controlled by movement of hydraulic fluid through the metered hydraulic orifice area 108 from the contracting reserve chamber 118 to the pressure chamber 116. The shocks are efficiently absorbed by the low pressure air cushion 117. During this initial stage of retraction, the resistance to retraction is a function of the rate of retraction. The metering pin 54 may be provided with a slight inward and upward taper to further program the resistance.

The cylinders 22, 72 continue to retract relative to each other with resistance to retraction being provided by the forcing of hydraulic fluid through the orifice area 108 until the cylinders 22, 72 reach a predetermined position. When they reach such position, the stop surface 120 engages the shoulder 56 on the metering pin 54. FIG. 3 shows the cylinders 22, 72 retracted relative to each other almost to the predetermined position. As the aircraft taxis, taxiing shocks with a relatively high magnitude cause the cylinders 22, 72 to retract relative to each other beyond the predetermined position. The maximum taxi position is illustrated in FIG. 4.

Retraction of the cylinders 22, 72 beyond the predetermined position causes sliding movement of the floating member 52 relative to the inner cylinder 22. The engagement of the stop surface 120 and the shoulder 56 moves the floating member 52 axially downwardly relative to the inner cylinder 22 to move the high pressure piston 58 toward the bottom radial wall 32 of the high pressure insert 24. The movement of the piston 58 reduces the volume of the high pressure chamber 44 and thereby compresses the gas cushion formed therein. The compression of the high pressure cushion 44 provides greater resistance to retraction than was produced during the initial stage of retraction. As the volume of the high pressure chamber 44 decreases, the volume of the relatively low pressure chamber 116 remains constant and the volume of the reserve chamber 118 increases. Movement of the floating member 52 relative to the inner cylinder 22 is damped by flow of hydraulic fluid through the orifices 42 in the annular wall 40 between the upper portion of the reserve chamber 118 and the lower portion of the reserve chamber 118.

Figure 19:
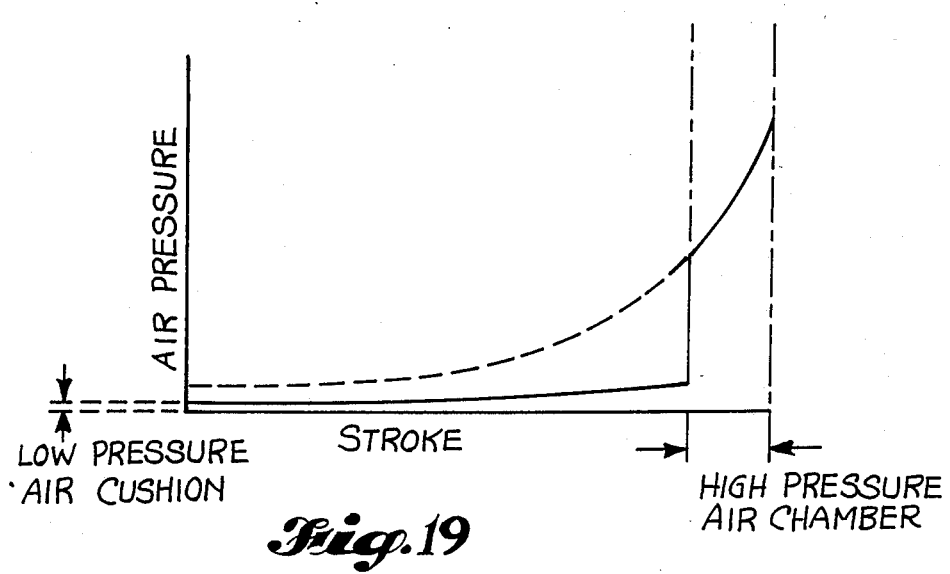
FIG. 19 is a graph of a stroke/pressure curve typical of the invention.

FIG. 19 is a graph illustrating the relationships between air pressure and stroke in the dual-mode shock strut 20 of the invention and a conventional single-mode shock strut. The stroke/pressure curve typical of the invention is represented by a solid line. The conventional curve is represented by a broken line. The two curves are the same in the right-hand portion of the graph which corresponds to the second mode of operation of the invention. During the second mode, the high pressure air cushion 44 has the same volume and pressure as that obtained during the taxiing range of the conventional shock strut. The left-hand portion of the graph corresponds to the first mode of operation, the energy absorption cycle. The low pressure air encountered during this cycle in the shock strut 20 of the invention improves the shock strut efficiency since a greater amount of energy is absorbed by the hydraulic fluid than can be absorbed in a conventionally inflated shock strut. As shown in FIG. 19, the air pressure during the energy absorption cycle of the invention increases a relatively small amount. At the end of the cycle, a step increase of the air pressure is experienced as the strut 20 enters its second or taxiing mode. In contrast, the air pressure in the conventional strut increases more rapidly in the energy absorption cycle and, at the end of the cycle, approaches the taxiing range.

Figure 12:
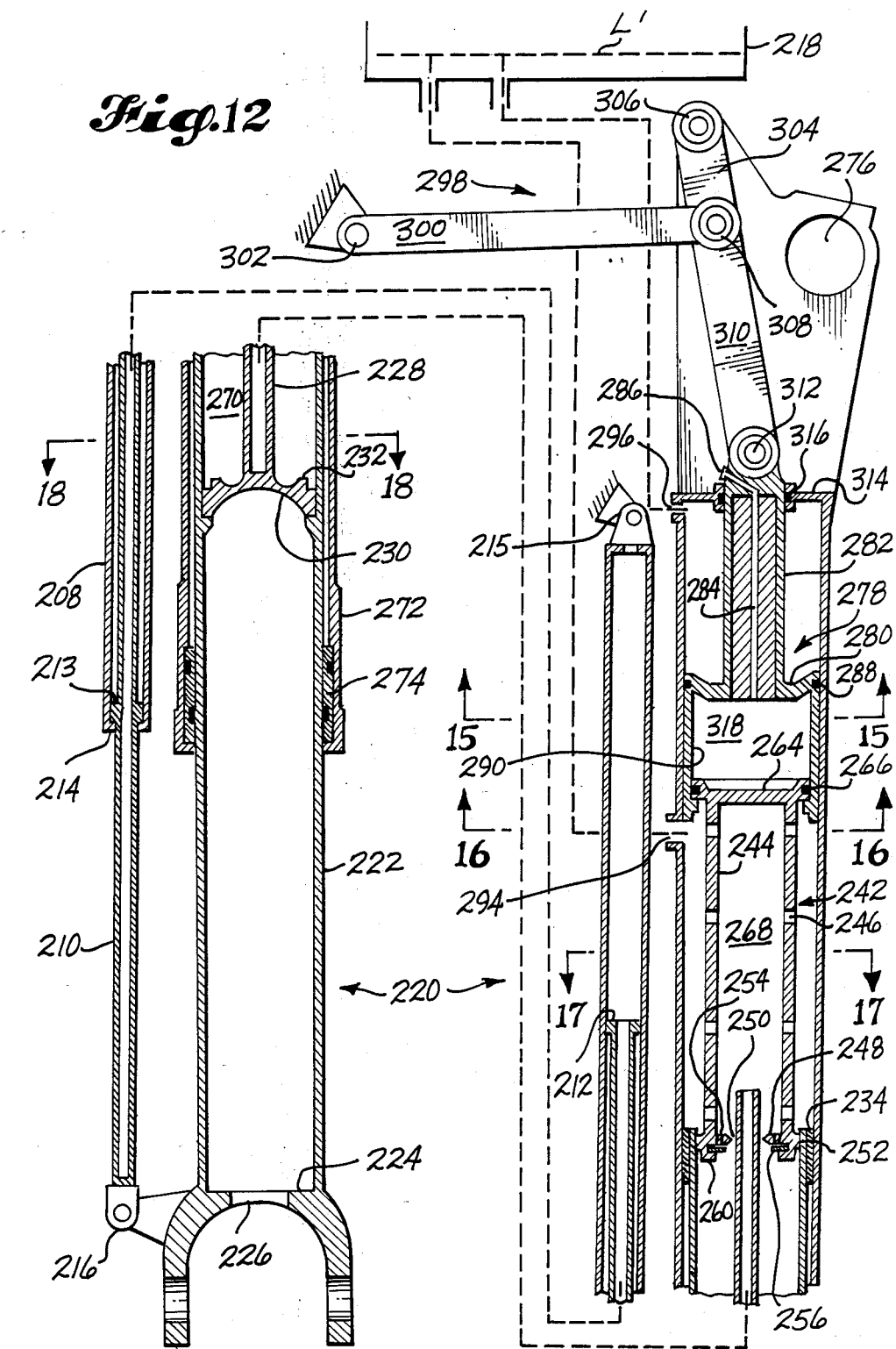
FIG. 12 is a sectional view of a second preferred embodiment of the apparatus of the invention, showing the shock strut in a fully extended position.
Figure 13:
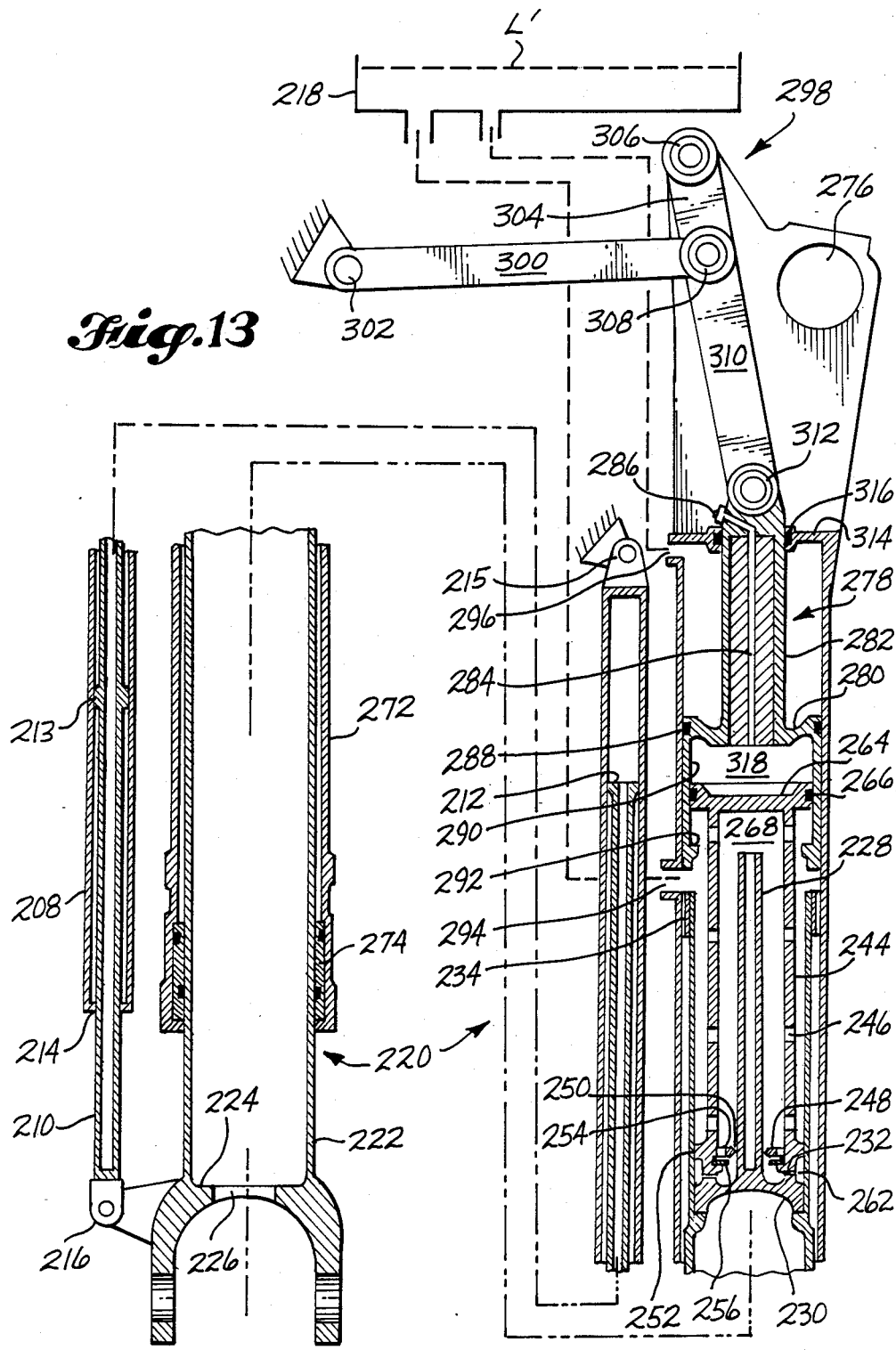
FIG. 13 is like FIG. 12 except that it shows the shock strut in a static or taxi position.
Figure 14:
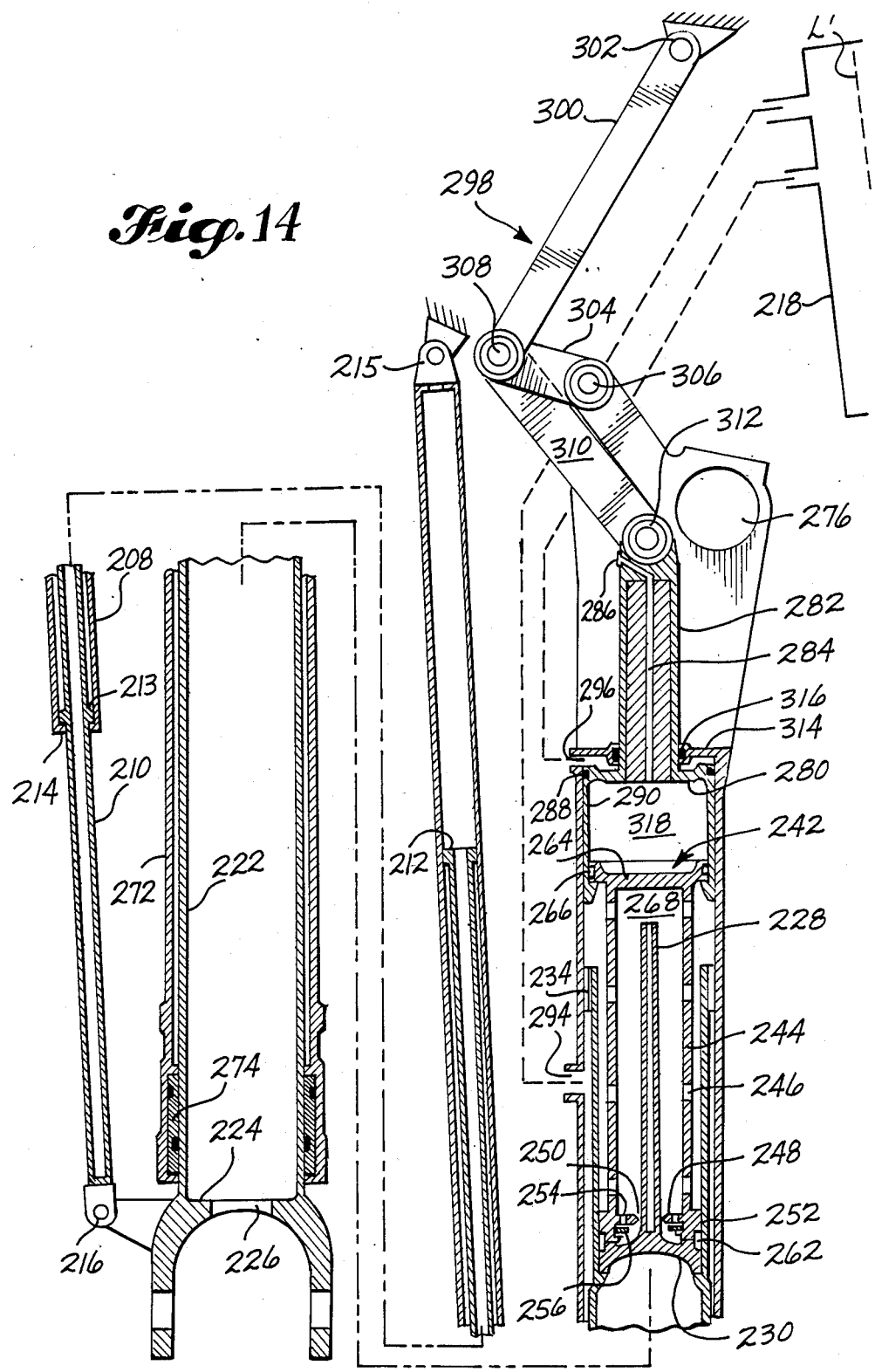
FIG. 14 is like FIGS. 12 and 13 except that it shows the shock strut in a stowed position.
Figure 15:
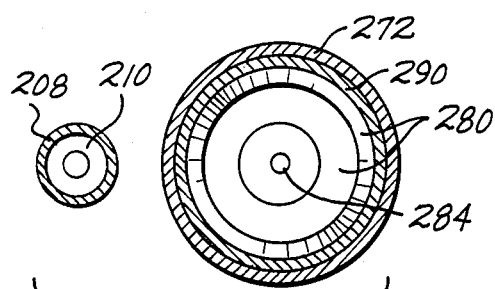
FIGS. 15-18 are cross-sectional views taken along the lines 15—15 through 18—18, respectively, in FIG. 12.
Figure 16:
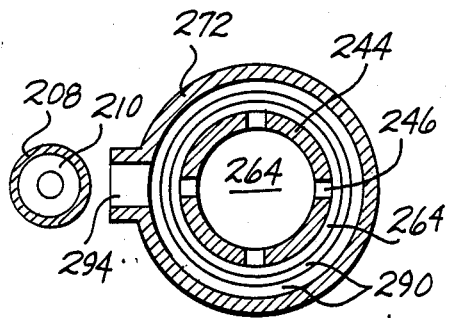
Figure 17:
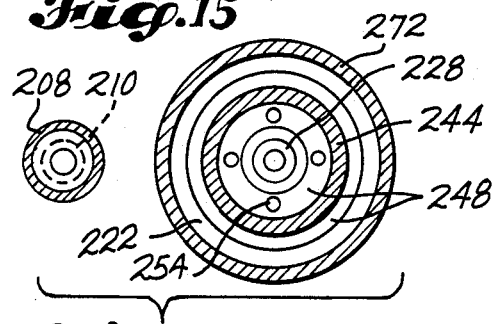
Figure 18:
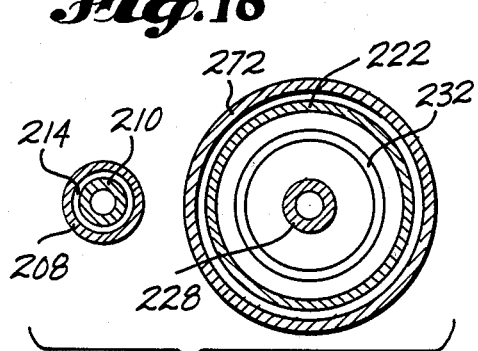

Taxiing shocks prior to takeoff are absorbed in the manner described above. Following takeoff, the inner cylinder 22 automatically extends to the position shown in FIG. 2. The actuator 6 is operated to pivot the shock strut 20 and landing gear from the landing position shown in FIGS. 2 and 3 to the stowed position shown in FIG. 4. As the shock strut 20 pivots, the shortening link 18 automatically pulls the inner cylinder 22 into the outer cylinder 72. This occurs because the connection of the shortening link 18 to the support structure 4 is offset relative to the connection of the shock strut 20. The shortening link 18 pulls the inner cylinder 22 into the outer cylinder 72 almost to the predetermined position, as shown in FIG. 4. The cylinders 22, 72 are not retracted beyond the position shown in FIG. 4. Therefore, the resistance to the retraction is relatively low, and the shortening of the shock strut 20 is accomplished with relatively little actuator effort. The relatively low pressure gas cushion 117 is compressed, but the high pressure gas cushion 44 remains at a constant pressure The shortening link 18 is not shown in FIGS. 2–4. However, the structure of the shortening link is shown in FIGS. 12–18 in connection with the second preferred embodiment. The shortening link 208, 210 shown in FIGS. 2–18 includes an outer tube 208 and inner tube 210. These tubes 208, 210 are arranged telescopically with respect to each other. The inner tube 210 has an annular guide flange 212 extending radially outwardly from its upper end and an annular stop flange 213 projecting radially from its midportion. The bottom end of the outer tube 208 has an annular lip 214 extending radially inwardly therefrom. The engagement of the stop flange 213 and the lip 214 limits outward telescoping movement of the tubes 208, 210 with respect to each other, as shown in FIGS. 12 and 14. The upper end of the outer tube 208 is pivotably secured to aircraft support structure at a pivot connection 215. The lower end of the inner tube 210 is pivotably attached to the lower end of the inner cylinder 222 at a pivot connection 216. The upper end of the outer cylinder 272 in the embodiment of FIGS. 12–18 is connected to the aircraft support structure at pivot connection 276 in the same manner that the outer cylinder 72 of the first embodiment is attached to the support structure 4, as shown in FIG. 1. The relative positions of the connections of the outer cylinder 272 and shortening tube 208, 210 are shown in FIGS. 12–14. As the shock strut 220 is pivoted into the stowed position shown in FIG. 14, the engagement of the stop flange 213 and the lip 214 prevents relative movement between the outer and inner tubes 208, 210, and the inner cylinder 222 automatically telescopes into the outer cylinder 272.

The shock strut 220 shown in FIGS. 12–18 functions in a manner similar to the shock strut 20 shown in FIGS. 1–11. The strut 220, like the strut 20, has an inner cylinder 222 and an outer cylinder 272 positioned telescopically with respect to each other, and a floating member 242. However, in the embodiment shown in FIGS. 12–18, the floating member 242 is carried by and is axially slidable with respect to the outer cylinder 272, rather than the inner cylinder 222. The two embodiments also differ in that the second embodiment of the shock strut 220 has the additional feature of auxiliary shortening means for further shortening the shock absorber by allowing the cylinders 222, 272 to retract relative to each other beyond the predetermined position without decreasing the volume of the high pressure chamber 318. The auxiliary shortening means comprises a linkage mechanism 298 described further below.

The inner cylinder 222 has a lower end wall 224 with an opening 226 which communicates the interior of the lower end of the cylinder 222 with the atmosphere. A metering pin 228 is carried by the inner cylinder 222 and is secured thereto by a radial mounting wall 230. The mounting wall 230 is provided sealing means (not shown) for sealing the area above the wall 230, which forms a reserve chamber 270, against leakage into the open area below the wall 230. The upper radial surface of the wall 230 has a ridge formed thereon which defines an annular stop surface 232. The upper end of the inner cylinder 222 carries a bearing assembly 234 which slidably engages the inner cylindrical surface of the outer cylinder 272. The upper end may also be provided with a rebound orifice and a recoil valve (both not shown) for the purposes described above in connection with the first embodiment shown in FIGS. 1–11.

The orifice plate 248 of the second embodiment is carried by the floating member 242. The floating member 242 also includes a high pressure piston 264 that forms the lower radial wall 264 of the high pressure chamber 318. The high pressure piston 264 is provided with a seal 266. An orifice support tube 244 extends between and integrally connects the orifice plate 248 and the high pressure piston 264. The orifice support tube 244 has openings 246 extending radially therethrough for providing free fluid flow between the areas inside and outside the tube 244. The orifice plate 248 defines a central axial opening into which the metering pin 228 is received. As in the first embodiment, the gap between the plate 248 and the pin 228 defines a metered hydraulic orifice area 250. The pin 228 may have a slight inward and upward taper to program resistance to flow through the orifice area 250. The orifice plate 248 defines the upper end of the reserve chamber 270.

The area above the orifice plate 248 defines a pressure chamber 268 with a relatively low pressure. Because of the relative positioning of the chambers 268, 270, 318 in this embodiment, in some installations the effective volume of the low pressure chamber 268 is preferably increased by providing a low pressure accumulator 218, as shown in FIGS. 12–14. Communication between the accumulator 218 and the portion of the lower pressure chamber 268 within the outer cylinder 272 is provided via a port 294 and a suitable conduit (not shown). The entire portion of the low pressure chamber 268 defined within the shock strut 220 and the lower portion of the low pressure accumulator 218 are filled with hydraulic fluid. The area above the hydraulic fluid level L' in the accumulator 218 is pressurized with air to provide a low pressure air cushion. The two pressure chambers 268, 318 are differentially pressurized in the same manner as the pressure chambers 44, 116 in the first embodiment of FIGS. 1–11.

The outer circumferential surface of the orifice plate 248 forms a bearing surface 252 which slidably and sealingly engages the inner circumferential surface of the upper end of the inner cylinder 222. The orifice plate 248 has apertures 254 and a disk check valve 256 which function in the same manner as the apertures 104 and check valve 106 of the first embodiment. The lower end of the floating member 242 forms an annular stop surface 260 which is engaged by the stop surface 232 on the metering pin mounting wall 230 when the cylinders 222, 272 reach the predetermined position at the end of the first stage of their retraction relative to each other. As the stop surfaces 232, 260 approach each other, hydraulic fluid is trapped in the annular area defined between the inner cylinder 222 and the ridges forming the stop surfaces 232, 260. This annular area forms a damper chamber 262 which functions in substantially the same manner as the damper chamber 124 of the first embodiment.

As noted above, the upper end of the outer cylinder 272 is pivotably attached to the aircraft support structure at a connection 276. The lower end of the outer cylinder 272 carries a bearing assembly 274 which slidably engages the outer cylindrical surface of the inner cylinder 222. Preferably, the lower end is also provided with a gland nut assembly (not shown) of the type shown in FIGS. 2–4. The cylinder 272 has a top end wall 314 with a center axial opening through which the support strut 282 of a high pressure insert 278, described further below, slides. An annular seal 316 is carried by the end wall 314 to prevent leakage out of the outer cylinder 272 around the support strut 282.

The auxiliary shortening means of the embodiment shown in FIGS. 12–18 comprises the high pressure insert 278 and the linkage mechanism 298. The upper end of the high pressure insert 278 is pivotably connected to an arm 310 of the linkage mechanism 298 at a pivot connection 312. The support strut 282 extends axially downwardly and into the outer cylinder 272 from the connection 312. A radial wall 280 is formed at the lower end of the support strut 282 and is supported thereby. The radial wall 280 carries a seal 288 to seal the sliding connection between the outer circumferential surface of the wall 280 and the inner circumferential surface of the outer cylinder 272.

The radial wall 280 forms the upper radial wall defining the high pressure chamber 318. The opposite lower radial wall of the high pressure chamber 318 is formed by the high pressure piston 264 carried by the floating member 242. An inflation tube 284 extends through the support strut 282 to permit pressurizing the high pressure chamber 318. The upper end of the inflation tube 284 has a closure 286 of a suitable type. The high pressure insert 278 also includes a cylindrical axial extension 290 opposite the support strut 282. The lower end of the axial extension 290 has an annular radial stop shoulder 292 that engages the high pressure piston 264 to limit axial movement of the floating member 242 and thereby limit movement of the high pressure piston 264 away from the radial wall 280 and expansion of the high pressure chamber 318.

The linkage mechanism 298 includes three links 300, 304, 310. The first link or arm 300 has one end pivotably attached to the aircraft support structure at a pivot connection 302. The opposite end of the arm 300 is pivotably attached to both of the other arms 304, 310 at a pivot connection 308. The second arm 304 has an opposite end pivotably attached to the outer cylinder 272 at a pivot location 306 offset from the connection 276 of the outer cylinder 272 to the support structure. The linkage mechanism 298 has a use position, shown in FIGS. 12 and 13, in which the high pressure insert 278 is in a lower use position and the linkage mechanism 298 maintains the insert 278 in such position. The linkage mechanism 298 also has a stowed position shown in FIG. 14. The pivot connections 302, 306, 308, 312 are positioned so that the linkage mechanism 298 acts as an overcenter latch for securely maintaining the high pressure insert 278 in its use position shown in FIGS. 12 and 13. The space within the outer cylinder 272 axially between the radial wall 280 and the end wall 314 is in communication with the accumulator 218 via a port 296. This keeps the space filled with hydraulic fluid to lubricate the seal 288 and thereby prevent the seal 288 from leaking. The pressure also assists the linkage mechanism 298 in holding the insert 278 in position.

The embodiment shown in FIGS. 12-18 absorbs shocks in the same manner as the embodiment of FIGS. 1-11. The shock absorber has a first mode of operation in which the metering pin 228 moves relative to the orifice plate 248. This relative movement forces hydraulic fluid out of the reserve chamber 270 through the orifice area 250 into the pressure chamber 268 to thereby provide resistance to the retraction of the inner cylinder 222 into the outer cylinder 272. During this first mode of operation, the volume of the high pressure chamber 318 remains constant, and the air cushion formed at the top of the low pressure accumulator 218 is compressed. When the retracting cylinders 222, 272 reach a predetermined position in which the stop surface 232 on the pin mounting wall 230 contacts the stop surface 260 on the floating member 242, the shock absorber enters its second mode of operation. In the second mode of operation, the continuing retraction of the tubular members 222, 272 relative to each other causes the floating member 242 to be moved axially upwardly relative to the outer cylinder 272 and the high pressure insert 278. This upward movement compresses the high pressure air cushion in the high pressure chamber 318 to provide greater resistance to the relative retraction of the cylinders 222, 272 and absorb the more severe taxiing shocks.

Following takeoff of the aircraft, the shock strut 220 is pivoted into its stowed position shown in FIG. 14. During the pivoting of the shock strut 220, the shortening link 208, 210 telescopes the inner cylinder 222 into the outer cylinder 272, as described above. In this embodiment, the pivoting of the shock strut 220 also causes the linkage mechanism 298 to draw the high pressure insert 278 axially upwardly and outwardly with respect to the outer cylinder 272. The stop shoulder 292 formed on the high pressure insert 278 engages the high pressure piston 264 to draw the floating member 242 upwardly along with the high pressure insert 278. Thus, the linkage mechanism 298 in effect moves the high pressure chamber 318 upwardly with respect to the outer cylinder 272. The upward movement of the high pressure chamber 318 allows the shortening link 208, 210 to retract the inner cylinder 222 into the outer cylinder 272 beyond the predetermined position without compressing the high pressure cushion in the high pressure chamber 318.

As used herein, the terms "top", "bottom", "upwardly", and the like refer to the use orientations shown in FIGS. 1, 2, 4, 12, and 13. These terms are used to facilitate the description of the invention and are in no way intended to indicate that the apparatus of the invention is limited to such use orientations.

Although the preferred embodiments of the invention have been illustrated and described herein, it is intended to be understood by those skilled in the art that various modifications and omissions in form and detail may be made without departing from the spirit and scope of the invention as defined in the following claims.

What is claimed is:

1. In an aircraft landing gear assembly, a shock absorber comprising:
   first and second generally tubular members positioned telescopically with respect to each other;
   a floating member carried by said first tubular member and axially slidable with respect to each of said first and second tubular members; said first and second tubular members and said floating member defining a first pressure chamber, a reserve chamber, and a second pressure chamber;
   passageway means for providing a metered hydraulic orifice area between the reserve chamber and the first pressure chamber; and
   stop means carried by said second tubular member for engaging said floating member and sliding said floating member relative to said first tubular member, when said tubular members retract relative to each other beyond a predetermined position, to reduce the volume of the second pressure chamber;
   said shock absorber having a first mode of operation in which the volume of the reserve chamber decreases and the volume of the second pressure chamber remains essentially constant as said tubular members retract relative to each other toward said predetermined position, and a second mode of operation in which the volume of the second pressure chamber decreases as said tubular members retract relative to each other beyond said predetermined position.

2. A shock absorber as described in claim 1, which comprises a first metering portion including a metering pin, and a second metering portion including a generally radially extending wall that defines said orifice area, one of said metering portions being secured to said second tubular member, and the other of said metering portions being carried by said floating member; and in which said first tubular member carries a radial wall that defines a first radial wall of the second pressure chamber, and said floating member includes a radial wall that defines a second opposite radial wall of the second pressure chamber.

3. A shock absorber as described in claim 1, in which said second tubular member carries a fixed metering pin; said first tubular member carries a radial wall that defines a first radial wall of the second pressure chamber; and the floating member includes a generally radially extending wall that defines said orifice area, and a radial wall that defines a second opposite radial wall of the second pressure chamber.

4. A shock absorber as described in claim 1, further comprising cushioning means carried by the stop means and the floating member for cushioning the engagement of the floating member by the stop means.

5. In combination:
   the shock absorber of claim 1;
   aircraft landing gear support structure to which one of said tubular members is pivotably attached; and means for pivoting the shock absorber into a stowed position relative to said support structure and for shortening the shock absorber, as it is being pivoted, by retracting said tubular members relative to each other substantially to said predetermined position.

6. The combination of claim 5, in which the shock absorber comprises a first metering portion including a metering pin, and a second metering portion including a generally radially extending wall that defines said orifice area, one of said metering portions being secured to said second tubular member, and the other of said metering portions being carried by said floating member; and in which said first tubular member carries a radial wall that defines a first radial wall of the second pressure chamber, and said floating member includes a radial wall that defines a second opposite radial wall of the second pressure chamber.

7. The combination of claim 5, in which said first tubular member is pivotably attached to said support structure and carries a radial wall that defines a first radial wall of the second pressure chamber, and the floating member includes a radial wall that defines a second opposite radial wall of the second pressure chamber; and which further comprises auxiliary shortening means for further shortening the shock absorber by allowing said tubular members to retract relative to each, other beyond said predetermined position without decreasing the volume of the second pressure chamber; said auxiliary shortening means comprising a linkage mechanism having opposite ends secured to said support structure and said first radial wall of the second pressure chamber, respectively, said linkage mechanism being pivotable to move said first radial wall axially upwardly relative to said first tubular member.

8. The combination of claim 7, in which said second tubular member carries a fixed metering pin, and the floating member includes a generally radially extending wall that defines said orifice area.

9. The combination of claim 7, in which said first radial wall has an axial extension with means for engaging said second radial wall to pull said second radial wall axially upwardly along with said first radial wall and maintain the volume of the second pressure chamber essentially constant as the linkage mechanism moves said first radial wall.

10. The combination of claim 9, in which said second tubular member carries a fixed metering pin, and the floating member includes a generally radially extending wall that defines said orifice area.

11. In an aircraft landing gear assembly, a shock absorber comprising:
first and second generally tubular members positioned telescopically with respect to each other;
a floating member carried by and axially slidable with respect to said first tubular member; said first and second tubular members and said floating member defining a first pressure chamber, a reserve chamber, and a second pressure chamber;
passageway means for providing a metered hydraulic orifice area between the reserve chamber and the first pressure chamber; and
stop means carried by said second tubular member for engaging said floating member and sliding said floating member relative to said first tubular member, when said tubular members retract relative to each other beyond a predetermined position, to reduce the volume of the second pressure chamber;
said shock absorber having a first mode of operation in which the volume of the reserve chamber decreases and the volume of the second pressure chamber remains essentially constant as said tubular members retract relative to each other toward said predetermined position, and a second mode of operation in which the volume of the second pressure chamber decreases as said tubular members retract relative to each other beyond said predetermined position;
in which said second tubular member carries a fixed generally radially extending wall that defines said orifice area, said first tubular member carries a fixed radial wall that defines a first radial wall of the second pressure chamber; and the floating member includes a metering pin, and a radial wall that defines a second opposite radial wall of the second pressure chamber.

12. A shock absorber as described in claim 11, in which the metering pin has a radial shoulder formed thereon; and the stop means comprises a substantially frustoconical wall extending from said radially extending wall radially inwardly and axially toward the second pressure chamber, and terminating in an outer end positioned to engage said shoulder.

13. A shock absorber as described in claim 11, in which the metering pin has a radial shoulder formed thereon; the stop means comprises a substantially frustoconical wall extending from said radially extending wall radially inwardly and axially toward the second pressure chamber, and terminating in an outer end positioned to engage said shoulder; and said outer end and said shoulder together form cushioning means for cushioning the engagement of the floating member by the stop means.

14. In combination:
in an aircraft landing gear assembly, a shock absorber comprising first and second generally tubular members positioned telescopically with respect to each other; a floating member carried by and axially slidable with respect to said first tubular member; said first and second tubular members and said floating member defining a first pressure chamber, a reserve chamber, and a second pressure chamber; passageway means for providing a metered hydraulic orifice area between the reserve chamber and the first pressure chamber; and stop means carried by said second tubular member for engaging said floating member and sliding said floating member relative to said first tubular member, when said tubular members retract relative to each other beyond a predetermined position, to reduce the volume of the second pressure chamber; said shock absorber having a first mode of operation in which the volume of the reserve chamber decreases and the volume of the second pressure chamber remains essentially constant as said tubular members retract relative to each other toward said predetermined position, and a second mode of operation in which the volume of the second pressure chamber decreases as said tubular members retract relative to each other beyond said predetermined position;
aircraft landing gear support structure to which one of said tubular members is pivotably attached; and
means for pivoting the shock absorber into a stowed position relative to said support structure and for shortening the shock absorber, as it is being pivoted, by retracting said tubular members relative to each other substantially to said predetermined position;

in which said second tubular member carries a fixed generally radially extending wall that defines said orifice area; said first tubular member carries a fixed radial wall that defines a first radial wall of the second pressure chamber; and the floating member includes a metering pin, and a radial wall that defines a second opposite radial wall of the second pressure chamber.

15. The combination of claim 14, in which the metering pin has a radial shoulder formed thereon; and the stop means comprises a substantially frustoconical wall extending from said radially extending wall radially inwardly and axially toward the second pressure chamber, and terminating in an outer end positioned to engage said shoulder.

16. The combination of claim 14, in which the metering pin has a radial shoulder formed thereon; the stop means comprises a substantially frustoconical wall extending from said radially extending wall radially inwardly and axially toward the second pressure chamber, and terminating in an outer end positioned to engage said shoulder; and said outer end and said shoulder together form cushioning means for cushioning the engagement of the floating member by the stop means.

17. In combination:
in an aircraft landing gear assembly, a shock absorber comprising first and second generally tubular members positioned telescopically with respect to each other; a floating member carried by and axially slidable with respect to said first tubular member; said first and second tubular members and said floating member defining a first pressure chamber, a reserve chamber, and a second pressure chamber; passageway means for providing a metered hydraulic orifice area between the reserve chamber and the first pressure chamber; and stop means carried by said second tubular member for engaging said floating member and sliding said floating member relative to said first tubular member, when said tubular members retract relative to each other beyond a predetermined position, to reduce the volume of the second pressure chamber; said shock absorber having a first mode of operation in which the volume of the reserve chamber decreases and the volume of the second pressure chamber remains essentially constant as said tubular members retract relative to each other toward said predetermined position, and a second mode of operation in which the volume of the second pressure chamber decreases as said tubular members retract relative to each other beyond said predetermined position;
aircraft landing gear support structure to which one of said tubular members is pivotably attached; and
means for pivoting the shock absorber into a stowed position relative to said support structure and for shortening the shock absorber, as it is being pivoted, by retracting said tubular members relative to each other substantially to said predetermined position;
in which said second tubular member is pivotably attached to said support structure and carries a fixed generally radially extending wall that defines said orifice area, said first tubular member carries a fixed radial wall that defines a bottom radial wall of the second pressure chamber; and the floating member includes a metering pin, and a radial wall that defines an opposite top radial wall of the second pressure chamber.

18. In combination:
in an aircraft landing gear assembly, a shock absorber comprising first and second generally tubular members positioned telescopically with respect to each other; a floating member carried by and axially slidable with respect to said first tubular member; said first and second tubular members and said floating member defining a first pressure chamber, a reserve chamber, and a second pressure chamber; passageway means for providing a metered hydraulic orifice area between the reserve chamber and the first pressure chamber; and stop means carried by said second tubular member for engaging said floating member and sliding said floating member relative to said first tubular member, when said tubular members retract relative to each other beyond a predetermined position, to reduce the volume of the second pressure chamber; said shock absorber having a first mode of operation in which the volume of the reserve chamber decreases and the volume of the second pressure chamber remains essentially constant as said tubular members retract relative to each other toward said predetermined position, and a second mode of operation in which the volume of the second pressure chamber decreases as said tubular members retract relative to each other beyond said predetermined position;
aircraft landing gear support structure to which one of said tubular members is pivotably attached; and
means for pivoting the shock absorber into a stowed position relative to said support structure and for shortening the shock absorber, as it is being pivoted, by retracting said tubular members relative to each other substantially to said predetermined position;
in which said second tubular member carries a fixed metering pin; said first tubular member carries a radial wall that defines a first radial wall of the second pressure chamber; and the floating member includes a generally radially extending wall that defines said orifice area, and a radial wall that defines a second opposite radial wall of the second pressure chamber.

19. A method for absorbing landing and taxiing shocks of an aircraft, comprising:
providing first and second generally tubular members positioned telescopically with respect to each other and having a first pressure chamber and a second pressure chamber;
pressurizing the first and second pressure chambers to create first and second gas cushions, respectively, with first and second maximum pressures, respectively, and first and second minimum pressures, respectively; said first maximum pressure being less than said second minimum pressure;
while the aircraft is in flight, pivoting said tubular members into a landing position, and substantially fully extending said tubular members with respect to each other;
landing the aircraft, and applying the compressive force of landing and taxiing shocks to said tubular members to cause them to retract relative to each other to a predetermined position;
while said tubular members are so retracting, allowing their retraction to compress the first gas cushion and maintaining the volume of the second gas cushion essentially constant;

when said tubular members reach said predetermined position, allowing said compressive force to cause them to retract relative to each other beyond said predetermined position; and while said tubular members are retracting beyond said predetermined position, allowing their retraction to compress the second gas cushion.

20. The method of claim 19, in which the step of allowing the retraction of said tubular members to compress the first gas cushion comprises allowing hydraulic fluid to flow through a metered hydraulic orifice area.

21. A method for absorbing landing and taxiing shocks of an aircraft, comprising:

providing first and second generally tubular members positioned telescopically with respect to each other and having a first pressure chamber and a second pressure chamber;

pressurizing the first and second pressure chambers to create first and second gas cushions, respectively, with first and second maximum pressures, respectively, and first and second minimum pressures, respectively; said first maximum pressure being less than said second minimum pressure;

while the aircraft is in flight, pivoting said tubular members into a landing position, and substantially fully extending said tubular members with respect to each other;

landing the aircraft, and applying the compressive force of landing and taxiing shocks to said tubular members to cause them to retract relative to each other to a predetermined position;

while said tubular members are so retracting, allowing their retraction to compress the first gas cushion and maintaining the volume of the second gas cushion essentially constant;

when said tubular members reach said predetermined position, allowing said compressive force to cause them to retract relative to each other beyond said predetermined position;

while said tubular members are retracting beyond said predetermined position, allowing their retraction to compress the second gas cushion; and accomplishing a takeoff of the aircraft with said members in said landing position; and then pivoting said members from said landing position into a stowed position, and as said members are pivoting, retracting said members relative to each other substantially to said predetermined position and maintaining the volume of the second gas cushion essentially constant.

22. The method of claim 21, further comprising, while pivoting said members into said stowed position, further retracting said members relative to each other beyond said predetermined position, and moving the second pressure chamber axially upwardly relative to said members to allow said members to further retract without compressing the second gas cushion.

* * * * *

UNITED STATES PATENT AND TRADEMARK OFFICE
CERTIFICATE OF CORRECTION

PATENT NO. : 4,907,760

DATED : March 13, 1990

INVENTOR(S) : Francis Sealey and Richard H. Weiland

It is certified that error appears in the above-identified patent and that said Letters Patent is hereby corrected as shown below:

Col. 1, line 48, delete the period after "weight".

Col. 2, line 16, "add" should be -- and --.

Col. 5, lines 25 and 26, insert -- pivots -- after "means for pivoting --.

Col. 10, line 38, there should be a period after "movement".

Col. 12, line 34, there should be a period after "pressure", second occurrence.

Claim 7, col. 17, line 28, delete the comma after "each".

Claim 17, col. 19, line 65, "area," should be -- area; --.

Signed and Sealed this

Twenty-eighth Day of January, 1992

*Attest:*

HARRY F. MANBECK, JR.

*Attesting Officer*     *Commissioner of Patents and Trademarks*